J. T. FOSTER.
Machine for Forming Snap-Hooks.

No. 159,314.  Patented Feb. 2, 1875.

J. T. FOSTER.
Machine for Forming Snap-Hooks.

No. 159,314. Patented Feb. 2, 1875.

Witnesses
H. W. Yerington
E. F. Hart

Inventor
John T. Foster

J. T. FOSTER.
Machine for Forming Snap-Hooks.

No. 159,314. Patented Feb. 2, 1875.

Witnesses
Inventor
John T. Foster

J. T. FOSTER.
Machine for Forming Snap-Hooks.

No. 159,314. Patented Feb. 2, 1875.

Witnesses: H. W. Gerington, E. F. Hart

Inventor: John T. Foster

UNITED STATES PATENT OFFICE

JOHN T. FOSTER, OF JERSEY CITY, NEW JERSEY, ASSIGNOR TO FRANCIS C. NYE, OF NEW YORK CITY.

IMPROVEMENT IN MACHINES FOR FORMING SNAP-HOOKS.

Specification forming part of Letters Patent No. 159,314, dated February 2, 1875; application filed December 24, 1873.

*To all whom it may concern:*

Be it known that I, JOHN T. FOSTER, of Jersey City, in the county of Hudson and State of New Jersey, have invented Improvements in Machinery for Bending and Making Snap-Hooks, of which the following is a specification:

My invention relates to an organized machine wherein wire is fed from a coil or reel, cut off, placed in proper dies, bent, shaped, and formed into snap-hooks, and delivered in a finished state from the machine by a series of automatic operations.

To enable others skilled in the art to make and use my invention, I will proceed to describe the same in connection with the drawings, in which—

Fig. 9 is a plan.

The same letters indicate the same parts in the several figures.

Figure 1:
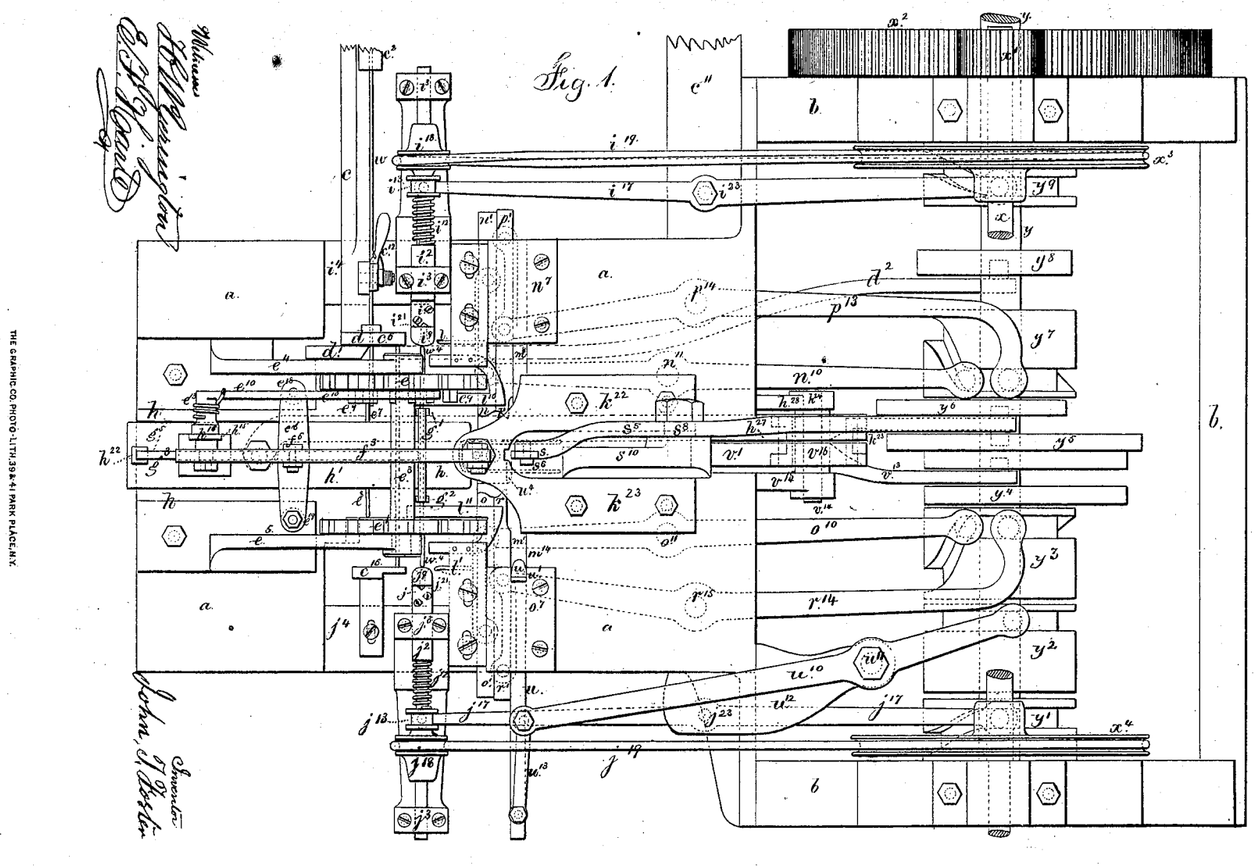
Figure 1 is a plan of the machine.
Figures 2, 17:
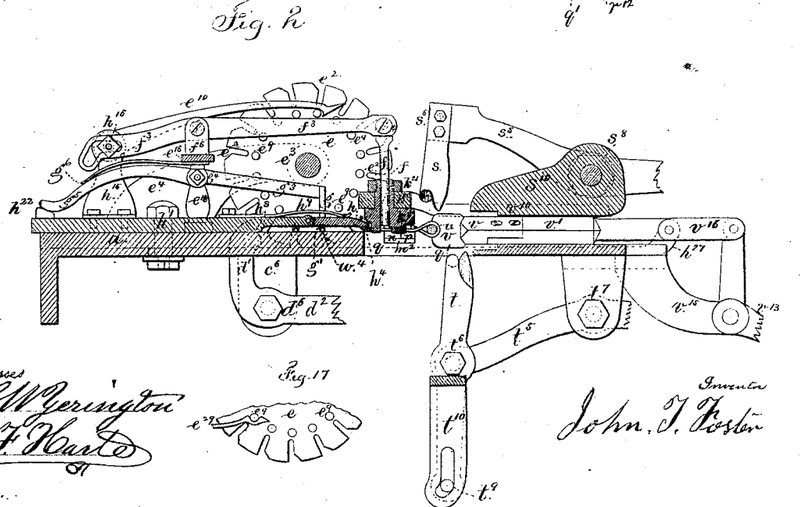
Fig. 2 is a vertical longitudinal section of the same.
Fig. 17 is an elevation of a portion of one of the roulettes.
Figures 3, 4, 8:
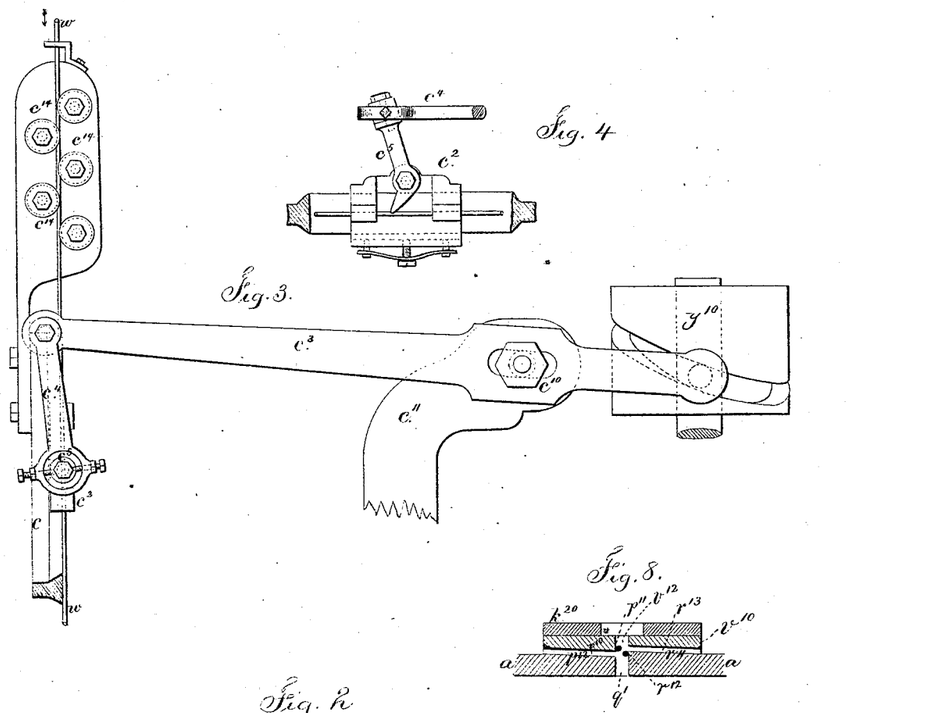
Fig. 3 is a plan of the wire-feeding mechanism.
Fig. 4 is an elevation of the wire-carrier.
Fig. 8 is a transverse section at about the line $z^1\,z^1$ of Fig. 5.

The bed $a$ and frame $b$ of the machine are of the requisite size, shape, and strength to receive the parts hereinafter described, and are supported upon suitable legs or standards. The motor-shaft $x$ is mounted in bearings in the frame $b$, and is rotated by hand or power, and gives rotation to the shaft $y$ by the pinion $x^1$ and wheel $x^2$. Upon this shaft $y$ are the cams which give the various movements to the dies or plungers which act upon the wire. The feeding device consists of the adjustable slide-bar $c$, extending at right angles from the left-hand side of the machine, (of which the side nearest to the rear of the machine is flat, and the upper and lower edges beveled,) and of the carrier $c^2$, which is dovetailed to fit the beveled edges of the bar, and is provided with a spring and gib at its lower edge, and is reciprocated back and forth on the flat side and beveled edges of the bar by its adjustable lever $c^3$ and link $c^4$. The carrier is channeled in its side with a round channel to allow the wire to pass through it, and has an opening to accommodate the dog or clamp $c^5$, which is pivoted to the upper part of the carrier. The lower end of the clamp is grooved to fit the wire, and rests upon the open part of the channel in the carrier, and is inclined to it toward the head $c^6$ of the slide-bar. The upper end of the clamp is united, by a universal joint, to the link $c^4$, which connects the carrier with the lever $c^3$, which moves it. The other end of this link is connected, by a stud, with the slotted end of the lever of the carrier. This lever has another slot at its fulcrum, through which passes an adjustable sleeve, having a collar on the under side of the lever, and secured to the lever by a nut, $c^{10}$, on its upper surface. A stud passes through this sleeve and a slot in an arm, $c^{11}$, extending from and secured to the side of the machine, and forms the fulcrum of the lever. The lever is thus made adjustable, and enables any required length of wire to be fed into the machine. Between the carrier and the head of the slide-bar an upright lug or ear is formed in the slide-bar, and the pawl $c^{12}$, on the flat side of the bar is connected with this lug by a pin, on which it moves, (see Fig. 1,) and its lower end is grooved to fit the wire and allow it to pass into the machine through the groove in the pawl and its short grooved seat for the wire, which is secured to the flat side of the slide-bar near its head, and upon which the pawl rests. The pawl is also inclined to the seat and toward the head $c^6$ of the slide-bar. A coil-spring secured to the lug of the pawl, and having its other end resting upon the upper end of the pawl, causes the pawl to press gently upon the wire in the seat. Upon an arm secured to the outer end of the slide-bar adjustable horizontal rollers $c^{14}$ are placed, between which the wire passes before it enters the carrier. The slide-bar is secured to the under surface of the bed $a$ by bolts passing through the bed outside of the bracket $e^4$, which supports the left-hand roulette $e$. The bed of the machine has a slot where these bolts pass through it, so as to adjust the shears $d$ $d^1$ to the required length of wire. The slide-bar rests upon the frame of the machine between the edge of the bed and the head $i^3$ of the milling-spindle, and is formed with a head, $c^6$, on the side next to the milling-spindle. To the lower part of this head the lever $d^2$ of the moving shear, $d^1$, is jointed, and in the upper part is screwed the fixed shear, $d$, and the hole through it tapers toward the inner or cutting end. The moving shear has a cutting-edge of a semicircular form, and works on an arc of a circle, having its center in the jointed fulcrum of the lever $d^2$, and face to face with the inner surface of the head $c^6$ of the slide-bar. (See Fig. 2.)

When the lever $c^3$ of the carrier $c^2$ commences to move forward the grooved end of the clamp $c^5$ takes a firm hold upon the wire $w$, previously passed through the channel of the carrier, and as the lever continues to move forward the wire $w$ is carried forward by the carrier, and moved through the grooved end of the pawl $c^{12}$ and its seat, and the aperture of the fixed shear $d$, and the notches $e^2$ of the roulettes $e$ $e^1$, and beneath the front plunger, $h$, past the guides $e^7$ $e^8$, and up to the adjustable stop $c^{16}$, which arrests the movement of the wire into the machine by the momentum of the carrier and its lever, and, with the adjustable slide-bar and lever of the carrier, insures the feeding of exactly the given length of wire into the machine, so that the snap-hook is formed of the determinate size. While the carrier $c^2$ moves backward the pawl $c^{12}$ holds the wire, and prevents it from being carried back, and the inclined end of the clamp of the carrier in like manner holds the wire while the carrier moves forward, and prevents the carrier moving on the wire. The wire is cut by the shears $d$ $d^1$ as soon as the carrier has completed its forward motion.

The piece of wire, cut to the proper length, is moved on the bed $a$ of the machine toward the former $k$, and presented to the milling-spindles $i^2$ $j^2$ by the radial notches or slots $e^2$ of two roulettes or disks, $e$ and $e^1$, secured on a horizontal shaft, $e^3$, having its bearings in two vertical brackets, $e^4$ $e^5$, secured to the bed of the machine on each side of the front plunger, $h$ $h^1$, and in front of the recesses $i^4$ $j^4$, where the milling-spindles are set, and extending toward the rear of the machine. The roulettes are placed on the shaft, between its bearings in the brackets, and each of the roulettes is provided with these notches $e^2$ in its periphery, at equal distances, and of uniform depth and width, which are sufficient to allow the wire to pass freely through the notches as it is fed into the machine, and out of them as it is moved by the front plunger, $h$ $h^1$, up to the former $k$. The shaft of the roulettes is set between the carrier $c^2$ and the milling-spindles, and at such height above the bed of the machine as to bring the lower notches of the roulettes, as they are rotated, into the openings in the bed, and to have the wire pass through the notches at about the middle of their depth. The notches are thus inclined to the bed of the machine, where the wire passes through them, and when it is delivered from them, but are nearly perpendicular to the bed when the ends of the wire are milled; and a portion of the notch is below the bed of the machine as the wire is moved along the bed in the notches of the roulettes. The notches are made with flaring mouths on the side where the wire enters them, so as to guide the end of the wire and insure its passing through the notches; and the wire is further guided, as it passes from one roulette, $e$, across the bed of the machine, and beneath the forward part, $h$, of the front plunger to the other roulette, $e^1$, by two suitable guides, $e^7$ $e^8$, secured to the bed of the machine in proper positions, one on each side of the front plunger, $h^1$; and the first of these guides, $e^7$, directs the wire downward, as well as across the bed, until it passes under the front plunger, $h$. The roulette $e$, next to the shears which cut the wire, is provided with pins $e^9$ on its inner side, one below each notch, and the hook of a catch, $e^{10}$, engages with these pins successively as they come to the proper position above the shaft $e^3$ of the roulettes, and, by its backward movement toward the front of the machine, partially rotates the roulettes periodically at the proper time, and moves the lower notches in the opposite direction, and the wire in the notches of the roulettes is thus advanced on the bed of the machine toward the former $k$. An upright standard, $h^{15}$, is secured to the upper surface of the back part, $h^1$, of the front plunger, and a horizontal stud, $h^{16}$, passes through this standard, to one end of which the catch $e^{10}$ is pivoted, and the other end of this stud is provided with a roller, which fits in the slotted end of the lever $f^3$ of the pusher $f$. The forward part of the catch $e^{10}$ is formed with a hook or projecting end, which rides over and drops behind one of the pins, $e^9$, of the roulette in its forward movement, and draws the pin in its backward movement, and thus rotates the roulettes. A coil-spring, $e^{13}$, passing around the stud $h^{16}$, to which the catch $e^{10}$ is pivoted, and resting on the catch, insures the hook of the catch dropping behind the pins $e^9$, and retaining its hold while it draws the pin backward. Both of the roulettes $e$ $e^1$ are exactly alike, except the pins $e^9$ upon the side of one of them, and they are secured to their shaft, so as to bring the notches $e^2$ of the respective roulettes exactly in line with one another.

Between the roulettes and the upright standard $h^{15}$, secured to the back part, $h^1$, of the front plunger, are two upright columns, $e^{18}\,e^{19}$, one on each side of the front plunger, and both within the brackets $e^4\,e^5$, which support the shaft of the roulettes. These columns are united at their upper ends by a cross-piece or yoke, $e^{16}$, and provided with bolts, which partially secure the brackets $e^4\,e^5$ to the bed of the machine. Two vertical slotted studs, $f^6\,g^4$, are secured to the middle of this yoke, one, $f^6$, to the upper, and the other, $g^4$, to the lower, surface of it; and the lever $f^3$ of the pusher $f$ is hung horizontally in the slot of the upper stud, $f^6$, and the lever $g^3$ of the griper $g$ in the slot of the lower stud, $g^4$. A flat spring, $e^{29}$, is secured between the bracket $e^4$ and column $e^{18}$, next to the roulette which has the pins, and this spring extends toward the roulette $e$, and is grooved at its other end in its upper surface to fit the pins $e^9$ of the roulette, which pass successively into this groove as the roulette is rotated, and are held steady there, thus keeping the roulettes from moving while the ends of the wire are milled. (See Fig. 17.) The distance between the notches of the roulettes is such that when one of the notches is in line with the wire as it is fed into the machine, the second notch from it toward the former $k$ is in line with the milling-spindles $i^2\,j^2$. When the catch $e^{10}$ commences to move backward, the two notches in the two roulettes $e\,e^1$, which correspond with each other, are in line with the wire as it is fed into the machine, and by each backward movement of the catch the next succeeding notches, one in each roulette, are brought in line with the wire as it is fed into the machine, and the next preceding notches are brought in line with the milling-spindles $i^2\,j^2$, while the notches second in advance are brought to the position where the piece of wire is delivered from them in advance of the front plunger, $h$, to be moved by it to the former. An adjustable stop, $c^{16}$, is secured to the bed $a$ of the machine, outside of the right-hand roulette $e^1$, and between the milling-spindle $j^2$ and the bracket $e^5$, and opposite to the notch of the roulette $e^1$, through which the wire passes as it is fed into the machine. This stop has a slot in its base, through which it is bolted to the bed $a$, and which enables it to be set at any required distance from the shears $d\,d^1$, which cut the wire.

The slot in the end of the lever $f^3$ of the pusher $f$ is angular, one portion of it running lengthwise of the lever, and the remaining or front portion inclining downward, and the roller which is fitted and moves in this slot causes the pusher $f$ to descend by its downward movement in the inclined part of the slot, and to ascend by its upward movement therein. The end $g^5$ of the lever $g^3$ of the griper $g$ is shaped to fit an inclined toe, $h^{22}$, secured to the front plunger, $h^1$, near the front of the machine, and in the forward movement of the front plunger, $h^1$, this toe $h^{22}$ passes under the inclined end $g^5$ of the lever $g^3$ of the griper $g$, and brings the griper down firmly upon the piece of wire $w^4$, that is ready to be milled, and holds it there until the milling is performed, and passes out with the backward movement of the front plunger, $h^1$, leaving the griper $g$ free to rise from the wire. A flat spring, $g^6$, secured between the yoke $e^{16}$ and its lower slotted stud, $g^4$, and resting on the lever $g^3$ of the griper $g$, between its fulcrum and its inclined end $g^5$, causes the griper $g$ to move up from the wire as soon as the front plunger, $h^1$, commences to move backward. The movement of the front plunger, $h$, thus gives motion at the proper time to the roulettes $e\,e^1$, the pusher $f$, and the griper $g$.

The roulettes are at rest while the carrier is feeding the wire into the machine, and the ends of the wire are milled, and they are moved only during the backward movement of the front plunger.

The ends of the wire are milled or dressed to the desired form by cutters $i\,j$, one on each side of the machine, secured to and near the inner ends of their spindles $i^2\,j^2$, which are supported in heads $i^3\,j^3$, secured in recesses, $i^4\,j^4$ in the bed of the machine. The spindles $i^2\,j^2$ have respectively two bearings in their heads $i^3\,j^3$, one at the outer end of each spindle and the other near the inner end. The bearings are formed in journal-boxes, half in the heads and half in the caps covering the spindles at the bearings, and secured to the heads. The spindles $i^2\,j^2$ are set transversely upon the machine and between the guides $l\,l^1$, and the head $c^6$ of the slide-bar on the left-hand side, and the adjustable stop $c^{16}$ on the right-hand side, of the machine. The inner end of each spindle is bored of a size to admit the wire, and the inner apertures, $i^9\,j^9$, of the bores are made flaring, so as to direct the ends of the wire into the bores, and insure the milling of the ends of the wire before it is formed into a snap-hook. The recesses $i^4\,j^4$ are made sufficiently deep to bring the bores in the inner ends of the spindles in line with the piece of wire on the bed of the machine, and the left-hand recess $i^4$ is large enough to receive as well the slide-bar $c$, with its head $c^6$, and the moving shear $d^1$, and the notches $e^2$ of the roulette $e$, as the head $i^3$ of the cutter $i$; and in order to accommodate these parts, the recess $i^4$ on that side of the machine is cut entirely through the bed $a$. The spindles $i^2\,j^2$ have recesses on one side near their inner ends, and the cutters $i\,j$ are set in these recesses where the bores in the spindles terminate. Upon the outer sides of these recesses, the spindles are provided with shoulders which are formed by turning the spindles of unequal diameters, the inner parts being of larger diameter than the outer, and these shoulders are supported and reciprocated back and forth in one of the bearings of the spindles. Coil-springs $i^{12}\,j^{12}$ are placed between these shoulders and loose collars $i^{13}\,j^{13}$, encircling the spindles and having square grooves in their periphery, in which engage rollers and studs secured to the levers $i^{17}\,j^{17}$, which move the collars backward and forward on the spindles. By means of this collar, spring, and shoulder, and the reciprocating motion of the spindle, each of the cutters is brought into yielding contact with the end of the wire during the milling, which is thus effected gently and uniformly. On the other side of the respective collars $i^{13} j^{13}$, and between them and the outer bearings, pulleys $i^{18} j^{18}$ are secured to the spindles by set-screws, and belts $i^{19} j^{19}$ pass respectively over these pulleys and other pulleys, $x^3$ $x^4$, on the upper shaft, $x$, of the machine, by which the spindles $i^2 j^2$ of the cutters are rotated. One of these belts, $i^{19}$, is crossed, and thus the spindles are rotated in opposite directions, which aids in preventing the wire from revolving during the milling of the ends. The bores in the ends $i^1 j^1$ of the spindles also support the wire while its ends are milled. The wire is kept from moving during the milling of its ends by the griper $g$, the notches $e^2$ of the roulettes, the bores in the ends of the spindles, the rotation of the spindles in opposite directions, and the yielding contact of the cutters $i j$ with the ends of the wire. The griper $g$ is forked, and the two prongs $g^1 g^2$ seize the wire on each side of the front plunger, $h h^1$. The ends of the prongs $g^1 g^2$ are provided with square grooves in line with the wire, and the width of the grooves is little less than the diameter of the wire, so that the two prongs $g^1 g^2$ of the griper impinge upon the wire with the edges of their grooves, and take a firm hold upon it. The griper $g$ stands vertical and in line with the milling-spindles $i^2 j^2$, and is brought down upon the wire by the horizontal lever $g^3$, extending from the middle of the griper toward the front of the machine. The cutters $i j$ are formed by steel pieces, grooved diagonally at one end, which comes next to the apertures $i^9$ $j^9$ of the bores in the spindles. The cutting-edges are exactly the same in both cutters, and of a semicircular or other shape proper to cut the ends of the wire to a tapering or other desired form. The ends of the wire are cut only by one of the upper edges of the grooves, one end of the wire being cut by the rear upper edge, $i^{21}$, and the other end by the front upper edge, $j^{21}$, of the groove. The thickness of the steel pieces and their position in the recesses of the spindles $i^2 i^2$ is such that the cutting-edges $i^{21} j^{21}$ meet the wire exactly in a plane passing through the center of the wire and parallel to the bed $a$ of the machine, on which the wire rests. The cutters $i j$ are secured to the recesses in the spindles by screws passing through slots in the steel pieces, and are sharpened by simply whetting the cutting-edges $i^{21} j^{21}$, and as the cutting-edges $i^{21} j^{21}$ wear off, the cutters are adjusted by the slots, which enable the cutters to be moved, one, $i$, forward, and the other, $j$, backward toward the center of the spindles $i^2 j^2$, sufficiently to bring the cutting-edges $i^{21} j^{21}$ always in contact with the wire at its ends when the milling is to be performed. The spindles $i^2 j^2$ of the cutters are rotated constantly, but are moved to and from the wire by the levers $i^{17} j^{17}$. The milling is performed on the circumference and toward the center of the wire, and the form of the cutters and their path of motion do not permit the ends of the wire to be shortened by the cutters. The milling is commenced immediately after the forward motion of the front plunger is finished, and is completed and the cutters moved backward from the wire by the time the piece of wire in advance of that on which the milling is performed is formed into a snap-hook.

The cut piece of wire, with its ends milled, is made into a snap-hook by the stationary die or former $k$, set about in the middle of the machine; the horizontal movable die or plunger $h$, having a reciprocating movement on the bed $a$, between the front of the machine and the former $k$; four horizontal movable dies or plungers, $n o p r$, having reciprocating movements on the bed $a$, two of them, $n p$, between the left-hand side of the machine and the former $k$, and two, $o r$, between the right-hand side and the former; the stationary dies or abutments $k^{17} p^{11} u^6 r^{12}$, against which two of these lateral plungers $p r$, one on each side of the machine, act; two vertical movable dies or plungers, $s t$, having reciprocating movements in an opening in the bed; a movable mandrel, $u$, and a horizontal movable die or plunger, $v$, having a reciprocating movement on the bed $a$, between the rear of the machine and the former, or the mandrel $u$, against which it acts.

The front plunger, which first bends the piece of wire against the former, is made in two parts, $h h^1$, which are united by a hinge or loose joint, (see Fig. 2,) and the forward part, $h$, is forked at its end, so as to make a horizontal opening in it of suitable size, grooved to fit the wire, and of a square, round, or other shape, to conform to the front projection, $k^2$, on the face of the former, round which it bends the wire to make the loop of the snap-hook. The forked end $h^4$ is depressed below the under surface of the remainder of the plunger to the same depth as the height of the seat of the back part, $h^1$, of the plunger, which is raised upon the bed $a$ of the machine a little higher than the diameter of the wire, so as to allow the pieces of wire to move freely on the bed of the machine beneath the plunger $h$, and between the seat of the back part, $h^1$, and the depressed end $h^4$ of the fore part of the plunger. This depression $h^4$ is inclined at the rear to the under surface of the remainder of the plunger, so that in the backward motion of the plunger the depressed end $h^4$ slides up on the most advanced piece of wire, which is held in the notches $e^2$ of the roulettes $e e^1$, and carried forward by them upon the bed $a$ of the machine while the plunger is moving backward, and drops down to the bed $a$ again as it falls behind this piece of wire, which is carried farther forward by the roulettes until it is delivered by them between the plunger and the former, ready to be bent into form. The bed $a$ of the machine is the seat upon which the depressed end $h^4$ of this plunger moves in its forward motion, and also in its backward motion, except while it is riding over the piece of wire. The forward end, $h^3$, of the raised seat of the back part of this plunger is in line with the seat of the wire $w$ as it is fed into the machine formed by the tubular shear $d$, the seat of the pawl $c^{12}$, and the channel of the carrier, and serves as a guide for the wire as it passes to the notch $e^2$ of the right-hand roulette $e^1$. The forward part, $h$, of this plunger is kept to the bed $a$ of the machine by a flat spring, $h^9$, secured to the upper surface of the back part, $h^1$, by a tap-bolt, which passes through the spring and plunger, and screws into one of the guides of the back part, $h^1$, of the plunger, and secures this guide to the under side of the plunger. The back part, $h^1$, of this plunger is also kept in position by another guide, secured to its under side by a tap-bolt, which passes through the plunger and the base of the upright standard $h^{15}$, and screws into the guide, and secures the standard $h^{15}$ to the upper surface of the back part, $h^1$, of the plunger. Both of these guides fit into a slot in the bed $a$ of the machine, and have flanges extending beyond the slot on each side, which move along the under side of the bed $a$, the guides being thus shaped like the letter T. These guides are beneath the plunger $h$, and are not shown in the drawings. As this plunger moves the piece of wire forward to the former $k$, the ends of the wire are brought up against two upright adjustable guides, $l$ $l^1$, one on each side of the plunger, with their front ends rounded off toward the front and sides of the machine, but having each of their rear ends at exactly the same distance from the central line of the machine, and parallel to each other. Each end of the wire is in contact with one of these rear points at the instant when the front plunger begins to bend the wire around the former $k$, and hence both of the hooks in the finished snap-hook are of the same size and shape. These guides $l$ $l^1$ are made adjustable by means of slots in their bases, through which pass screws, and secure the guides to the under surfaces of two horizontal guides, $l^{10}$ $l^{11}$, one on each side of the machine, which keep the wire down upon the bed of the machine while it is moved from the roulettes to the former, and during the first part of the sweep of the arms of the wire round the former. The stationary die or former is composed of a square head, $k$, and a shank, $k^1$, on which is a screw-thread, and the face of the former is provided with two projections, $k^2$ $k^3$, against which the wire is bent by the plungers to form the loop and middle bends of the snap-hook, or with but one projection, $k^3$, when the former is used in making a snap-hook without the inward bends $w^7$ $w^8$. The surfaces $k^4$ $k^5$ of the face are beveled or inclined in opposite directions, and both of these inclined surfaces make the same angle with the flat shoulder $k^6$ of the former, where the shank $k^1$ projects from the head $k$. The surfaces $k^4$ $k^5$ of the face are inclined, so as to allow the two arms of the wire to be sprung up and down, respectively, without bending them out of a straight line when the wire is bent round the former by the front plunger, and hence the sides of the face are inclined both longitudinally and transversely, the left-hand side, $k^4$, as the former stands in the machine, being inclined from the rear $k^7$ of the head upward to the front $k^8$, and from the middle of the face upward to the left-hand side, $k^9$, of the head, so as to allow the left-hand arm of the wire to be sprung down, and the right-hand side, $k^5$, of the face being inclined from the front, $k^8$, upward to the rear, $k^7$, of the head, and from the middle of the face downward to the right-hand side, $k^{10}$, of the head, so as to allow the right-hand arm to be sprung up. These surfaces $k^4$ $k^5$ also support and guide the lateral plungers $n$ $o$ $p$ $r$ in making their bends in the wire against the former $k$. The shank $k^1$ of the former has a hole, $k^{11}$, through its center, which extends through the head $k$, and the aperture in the face of the former is between the two projections $k^2$ $k^3$ on the face. The rod or pusher $f$, which knocks off the finished snap-hook from the machine, is fitted in this hole, and moved up and down in it. The lower end of the pusher is provided with a head shaped like the letter T, and the face of the former has a recess in it to accommodate the head of the pusher when it is withdrawn within the former $k$ during the forming of the snap-hook. In the downward movement of the pusher the T-head meets the arms of the finished snap-hook at the neck formed by the inward bends between the loop and the swell in the arms, and pushes the snap-hook gently from the former. The upper end of the pusher is connected by a pin and socket with the lever $f^3$, which actuates the pusher. The shank $k^1$ and head $k$ of the former are made in one piece, and the projections $k^2$ $k^3$ on the face may also be made in the same piece; but I prefer to make them in separate pieces, so that they may be removed if they get broken, or it is for any other reason desirable to change them and new ones put in their places without changing the whole former. The projection $k^2$, round which the loop $w^6$ is formed, is dovetailed to the face of the former and secured thereto by a screw, $k^{13}$, passing through the front $k^8$ of the head, and the other projection $k^3$ is fitted in the socket in the face and secured thereto by a pin passing through the right-hand side $k^5$ of the head. The back $k^7$ of the head of the former is provided with a slot, $k^{16}$, and the sides of the slot $k^{16}$ support the upper vertical plunger, $s$, preventing it from being sprung out of its proper path, and the depressed end $k^{17}$ at the left-hand side of the slot makes, in conjunction with the under surface, $p^{11}$, of the cap $v^{10}$ of the rear plunger, $v$, at the left-hand side of the slot $v^{12}$ in the cap, with which it is in line, the abutment against which the opposite or upper arm of the wire is bent when the arms are crossed. A small portion of each of the hooks is formed by the vertical plungers $s\ t$ in this slot $k^{16}$ in the former. The back $k^7$ of the head of the former, on the right-hand side of the slot, is grooved at its lower edge, where it guides and supports the square head $u^1$ of the mandrel $u$. The former is placed in about the center of the machine, with its face down and its shank $k^1$ up, and the projection $k^2$, around which the loop is formed, nearest to the front of the machine, and the slot $k^{16}$ in the former nearest to the rear of the machine, and with the back $k^7$ of the head extending beyond the rear side, $u^7$, of the upright standard $u^4$ sufficiently to afford a seat and support for the square head $u^1$ of the mandrel $u$, and the former $k$ is secured to a support, $k^{20}$, of suitable shape by a nut, $k^{21}$, and the support is bolted at its ends $k^{22}\ k^{23}$ to the cap $v^{10}$ which covers the rear plunger, $v$. An opening, $q\ q^1$, is made in the bed $a$ beneath the former, and extending toward the rear of the machine, of which the portion $q$ in front of the upright standard $u^4$ is of similar shape to the snap-hook from the loop to the crossing of the arms, and the remaining or rear portion, $q^1$, is square. The width of the rear portion, $q^1$, is a little more than the two diameters of the arms of the wire, and its length is sufficient to allow the two arms of the wire to be carried into it in the crossing of the arms, and the vertical plungers $s\ t$ and the vertical portion $v^2$ of the rear plunger, $v$, to move in it in forming the hooks of the snap-hook, and the entire opening is large enough to admit of the finished snap-hook dropping freely through it when it is knocked off of the former. The projections $k^2\ k^3$ on the face of the former enter this opening $q$ for a short distance, and the inclined surfaces $k^4\ k^5$ of the face of the former overhang the upper surface of the bed $a$ of the machine, and are a little more than the diameter of the wire above it on each side of the opening. By placing the former $k$ in the position shown in Figs. 2 and 6, and forming the opening $q\ q^1$ in the bed of the machine below it, the snap-hook is allowed to drop from the machine after it is finished, and, when the pusher $f$ knocks it off the former $k$, into a receptacle set under the machine. The front plunger, $h$, in its forward motion, meets the piece of wire which lies upon the bed of the machine between the plunger $h$ and the former $k$, and moves it forward out of the notches $e^2$ of the roulettes, and against the front projection, $k^2$, on the face of the former, and the forked end of the plunger bends the wire round the projection $k^2$, and causes the two arms of the wire, one on each side of the machine, to sweep over the bed $a$ of the machine, and the lateral plungers $n\ o\ p\ r$, lying in their recesses in the bed $a$, and the right-hand arm of the wire is moved up the inclined plane $r^{11}$ upon the bed of the machine, and the inclination of the upper surfaces of the plungers $o\ r$, and of the standard $u^4$, which supports the head of the mandrel, and beneath the recess in the under surface, above the inclined plane $r^{11}$ of the cap $v^{10}$, which covers the rear plunger; and the left-hand arm is moved down the depression $p^{12}$ in the bed of the machine, and the upper surface of the steel piece $m^3$ set in the recess in the bed $a$, and of the two plungers $n\ p$ on that side of the machine, and beneath the recess in the under surface of the cap $v^{10}$ of the rear plunger above the depression $p^{12}$ in the bed. The arms of the wire are also swept under the overhanging inclined surfaces $k^5\ k^4$ in the face of the former, corresponding respectively to the inclination and depression below them where the arms are sprung up and down. The arms of the wire are elevated and depressed, respectively, to the extent of a little more than one-half of the diameter of the wire at the point where the arms cross each other, so that the two arms are in contact with each other where the crossing is made in them. The plane of elevation of one arm and the plane of depression of the other make, respectively, the same angle, with the plane parallel to the upper surface of the bed of the machine, and passing through the front plunger, $h$, the former $k$, and the center of the wire between them. The arms of the wire are sprung up and down, respectively, as they are swept around the former, in order to carry the two arms across each other, after the lateral bends are made in them, without making an abrupt or sharp bend in one or both of the arms, and to keep the arms straight until the vertical plungers meet them, and to preserve the spring of the wire in the finished snap-hook at the point where the arms cross each other. The elasticity of the wire at that point keeps the arms of the wire always in contact with each other in the snap-hook. The ends of the arms of the wire are guided as they are elevated and depressed, respectively, by the under surface of the cap $v^{10}$, which covers the rear plunger, $v$. This cap is set on the bed of the machine, with its front edge in line with the rear side, $m^{14}$, of the recess $m^1$ in the bed, and has a slot, $v^{12}$, in it of the same size and in line with the square opening $q^1$ in the bed, which is to the rear of the rear side, $m^{14}$, of the recess $m^1$ in the bed. The vertical plungers $s\ t$ and the vertical portion $v^2$ of the rear plunger make part of their movement in this slot. The inclined plane $r^{11}$, up which the right-hand arm of the wire is sprung, is set on the bed $a$, to the rear of the recess $m^1$ in the bed, and in line with the side $m^{14}$ of the recess $m^1$, and with its back $r^{12}$ in line with the right-hand side of the square opening $q^1$ in the bed, and is secured to the bed $a$ by countersunk screws, and its upper surface is also inclined from the side in line with the side $m^1$ of the recess upward to its opposite side. The depression $p^{12}$ in the bed $a$, down which the left-hand arm of the wire is sprung, extends to the rear of the recess $m$ in the bed, and is inclined from the left-hand side of the square opening $q^1$ in the bed upward to the length of the inclined plane $r^{11}$, and from the side of the recess $m$, toward the rear of the machine, downward to the width of the inclined plane $r^{11}$. The under surface of the cap $v^{10}$ of the rear plunger has two recesses, $r^{13}\ p^{10}$, in it, one on each side of the slot $v^{12}$ in the cap, and above and parallel with the inclined plane $r^{11}$ and the depression $p^{12}$ in the bed, respectively, and the space between each of these recesses and the inclined plane and depression below them, respectively, is sufficient to allow the respective arms of the wire to pass freely up and down in it. The height of the inclined plane, as well as the depth of the depression, is sufficient to bring the two arms of the wire nearly in contact in making the crossing in them. The upper surface of the upright standard $u^4$ is beveled or inclined both from its inner end, $u^6$, toward the side of the machine, downward, and from its front side, $u^8$, upward to the opposite side, $u^7$, in line with the inclind plane $r^{11}$, and the upper surface of the steel piece $m^8$ is inclined both from its inner end, toward the side of the machine, upward, and from its front side downward to the opposite side, so as to be in the same plane with the depression $p^{12}$ in the bed, and afford seats for the respective arms of the wire as they are sprung up and down in their sweep round to the former. This movement of the front plunger makes the first bend in the wire, partially forming the loop, and leaves the two arms of the wire with their ends resting, respectively, upon the inclined plane $r^{11}$ set on the bed, and the depression $p^{12}$ in the bed.

There are four lateral plungers, $n\ o\ p\ r$, two on each side of the former, which are made in two parts, $n\ n^1\ o\ o^1\ p\ p^1\ r\ r^1$, united by a hinge or joint, $n^2$, and move forward and backward in recesses $m\ m^1$, sunk in the bed of the machine, and up and down the beveled edges of flat plates $m^2\ m^3$, fitted in the recesses $m\ m^1$, and forward and backward upon these plates, and in directions at right angles to the front plunger, $h$.

The recesses $m\ m^1$ are made to fit the plungers $n\ o\ p\ r$, which are embedded in them side by side, and move to and from the former in contact with each other, and the plates $m^2\ m^3$, fitted in the recesses, have their inner edges, $m^4\ m^5$, square, and their outer edges, $m^6\ m^7$, beveled or inclined abruptly to the bed of the recesses, and toward the side of the machine, and the respective outlines of the square or inner edges, $m^4\ m^5$, of these plates are the same as the opening $q$, with which they are set in line, and the plates $m^2\ m^3$ are secured to the bed of the recesses by countersunk screws. Each of these plates is of the same and uniform thickness, which is a little more than the diameter of the wire. The recess $m^1$ in the bed of the machine, upon the right-hand side of the opening, is made wider than the recess $m$ upon the left-hand side, and the length of each of these plates $m^2\ m^3$ is the same as the width of the recess in which it fits; but the recesses $m\ m^1$ may be conveniently made in the bed of the machine before the opening $q$ is made by cutting a continuous recess of equal width in the bed, or casting the bed with the recess in it from side to side, and in that case a blank steel piece, $m^8$, is set in the recess on the left-hand side of the opening, on a level with the bed, and having its inner end in line with the opening and opposite to the mandrel $u$, thus reducing the recess $m$ to the width required for the two lateral plungers $n\ p$ alone. This steel piece $m^8$, or the bed of the machine at the corresponding place, has a cavity, $m^9$, in its upper surface, at its inner end, opposite to the mandrel $u$, and this cavity $m^9$ conforms in shape to the tapering end of the round mandrel, and supports it while the hooks are bent around it. The side $m^{11}$ of this piece supports the lateral plunger $p$ next to it, while the plunger is acting on the wire, and guides it in its forward and backward motion. The longer plate $m^3$ has an upright standard, $u^4$, in it, which is in line with the opening $q$ in the bed at its inner end, $u^6$, and divides the recess $m^1$ in two parts, in one of which the two lateral plungers $o\ r$ work, and in the other the mandrel $u$, and the standard $u^4$, which may be made in one piece with the plate $m^3$, serves as a support on one side, $u^8$, for the plunger $r$ next to it, while the plunger is acting on the wire, and on the other, $u^7$, for the square head $u^1$ of the mandrel while the hooks are formed round the mandrel. The inner end, $u^6$, of the standard is opposite to the side $k^{17}$ of the depression in the face of the former $k$, and makes, in conjunction with the back $r^{12}$ of the inclined plane $r^{11}$ set on the bed, the abutment against which the opposite or lower arm of the wire is bent when the arms are crossed.

The lateral plungers $n\ o\ p\ r$ are jointed freely, so as to rest in the recesses $m\ m^1$ in the bed of the machine, and allow the wire to pass over them as it is swept round on the bed $a$ to the former $k$ by the front plunger, $h$, and so as to permit their inner ends to be elevated and depressed in the course of their forward and backward motion. The back part $n^1\ o^1\ p^1\ r^1$ of each of the lateral plungers is exactly flush with the upper surface of the bed of the machine, and the under surface of the fore part of each of them is cut away for at least so much of the length of the plunger from its inner end toward the joint $n^2$ in the plunger as advances along the plate $m^2\ m^3$ set in the recess in the forward motion of the plunger, and the lower edge of the inner end of each of the lateral plungers is rounded so as to ride easily up and down the beveled edge $m^6\ m^7$ of the plate. The upper surface of the forward part of each of the lateral plungers is beveled or inclined at its inner end, both from side to side and lengthwise, so as to correspond respectively with the inclination of the inclined plane $r^{11}$ set on the bed, and with the depression $p^{12}$ in the bed, and so that when the plungers $n\ o\ p\ r$ are bending the wire round the former their inner ends may be supported at their upper surfaces by the beveled faces $k^4\ k^5$ of the former. Accordingly, the upper surface of the inner end of the first of the lateral plungers, $n$, on the left-hand side of the former, is beveled downward from the front to the rear side and upward from the inner end, and the corresponding surface of the second lateral plunger, $p$, next to it is beveled still more in both directions, to allow the left-hand arm of the wire to be sprung down as it is swept up to the former by the front plunger, $p$; while the corresponding surface of the first lateral plunger on the right-hand side of the former is beveled upward from the front to the rear side and downward from the inner end, and the corresponding surface of the second lateral plunger next to it is beveled still more in both directions to allow the right-hand arm of the wire to be sprung up as it is swept up to the former by the front plunger, $h$. The inner ends of the lateral plungers $n\ o\ p\ r$ are made to conform respectively with the projections $k^2\ k^3$ on the face of the former $k$, against which they bend the wire, and are provided with grooves which fit the wire and are inclined so as to correspond with the upward and downward direction of the respective arms of the wire. Two of the lateral plungers, $p\ r$, not only finish the middle bend in the respective arms of the snap-hook commenced by the other lateral plungers, $n\ o$, but also carry the arms across each other— the upper or right-hand arm over the lower arm and the lower or left-hand arm under the upper arm—and bend them against dies, stops, or abutments $k^{17}\ p^{11}\ u^6\ r^{12}$, so that when the motion of these plungers is ended the two arms are crossed and bent nearly straight and parallel to each other.

Figures 5, 6, 12, 13, 14, 15, 16:
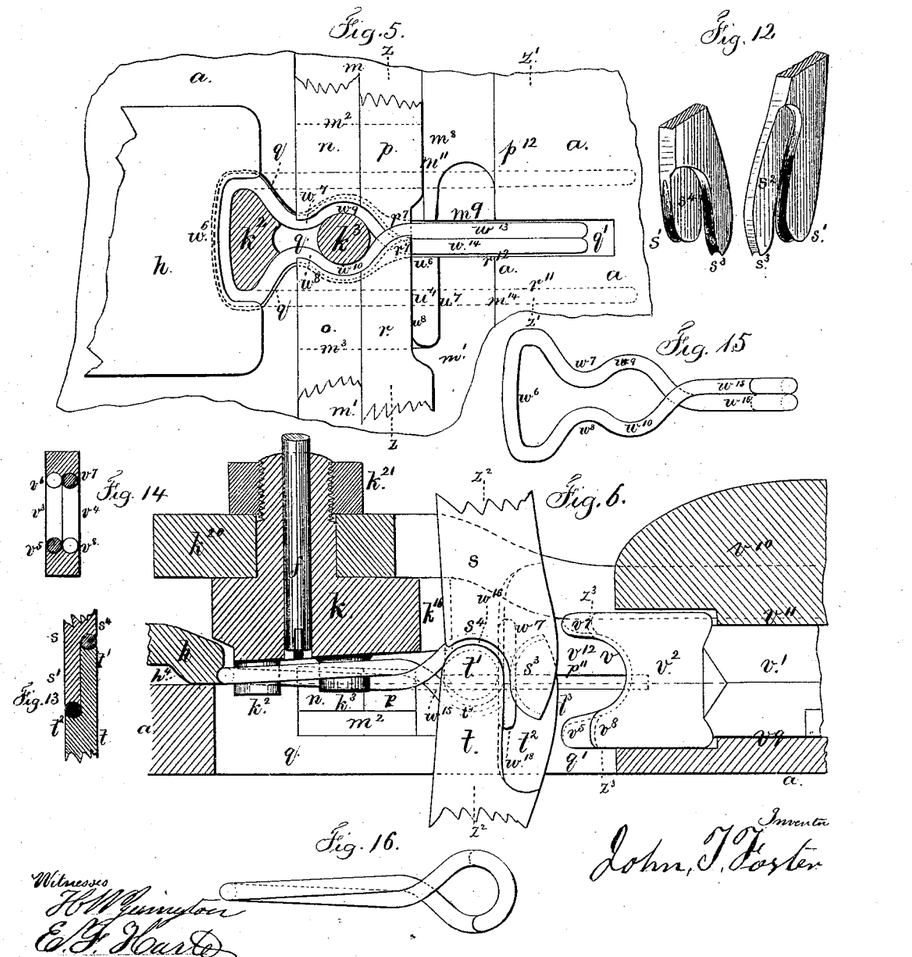
Fig. 5 is a plan view with the former in section, and shows portions of the front and side plungers, and the shape the wire assumes as bent by them.
Fig. 6 is a vertical longitudinal section of the former and adjacent parts.
Fig. 12 is a perspective view of the lower portion of the upper vertical plunger, both sides of which are shown.
Fig. 13 is a section through the upper and lower vertical plungers at the line $z^2\,z^2$ of Fig. 6.
Fig. 14 is a section of the rear plunger at the line $z^3\,z^3$ of Fig. 6.
Figs. 15 and 16 are elevations of the snap-hook complete.
Figure 7:
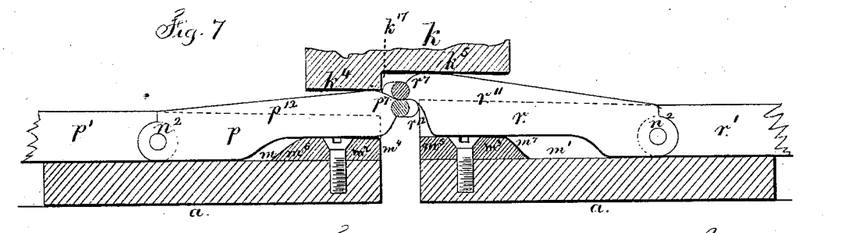
Fig. 7 is a transverse section at about the line $z\,z$ of Fig. 5.
Figure 9:
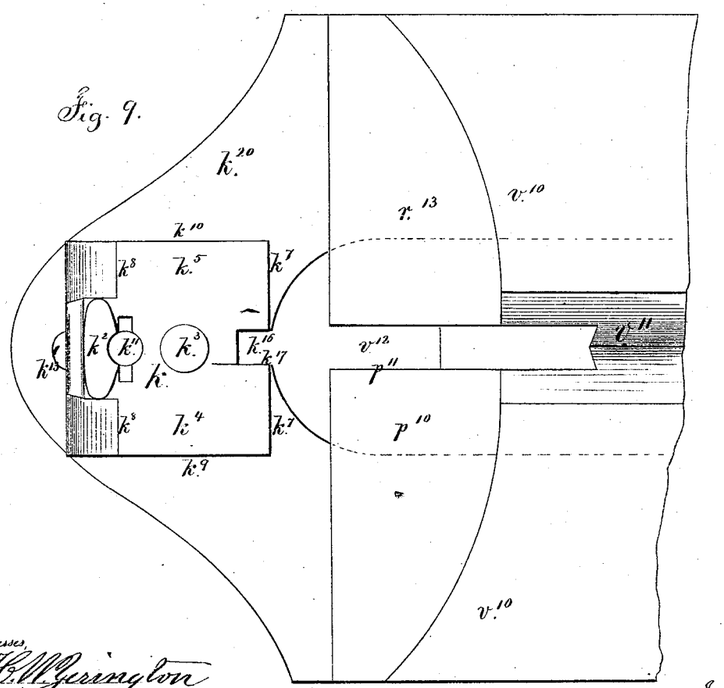
Figure 10:
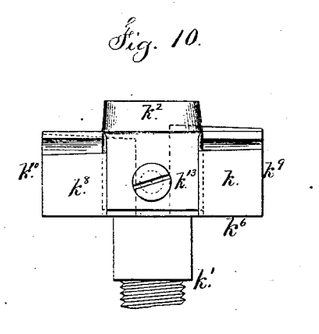
Figs. 10 and 11 are elevations, of the former, the parts being shown as inverted from the position in the machine.
Figure 11:
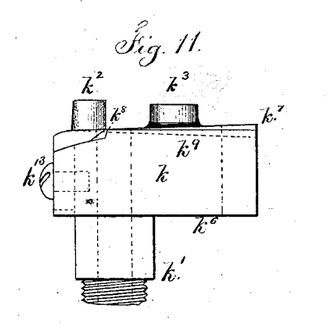

The inner ends of the lateral plungers $p\ r$, which cross the arms of the wire, are each of them provided with a finger, $p^7\ r^7$, at their upper edges on the side nearest to the back plunger, $v$, which may be formed by elongating the end of each of the plungers $p\ r$ at that place, and the plungers bend the wire by means of these fingers or elongated ends. The groove in the end of each of these plungers is continuous, extending from one side of the plunger to the other. The projecting end $r^7$ of the plunger $r$, which moves the upper wire, has a recess beneath the finger $r^7$, so as to allow it, with the upper wire in its groove, to pass over the lower wire in the groove of the plunger $p$, and reciprocally to allow the lower wire in the groove of the finger $p^7$ of the plunger $p$, which moves it, to pass under the finger $r^7$ in the crossing of the two arms of the wire; and the thickness of this finger $p^7\ r^7$ is sufficient to allow the grooves to be made in it, though but little more than the diameter of the wire. The under surface of this finger $r^7$ at the rear edge, and the recess below this finger, are made concave, so as to fit the wire, and afford a seat for the lower wire while the vertical plunger $t$ is making the upward bend $w^{16}$ in it, and the upper surface of the finger $p^7$ of the plunger $p$, which moves the lower wire at its rear edge, is made concave, so as to fit the wire and afford a seat for the upper wire while the vertical plunger $s$ is making its downward bend $w^{15}$ in it. The upper surfaces of these plungers are partly guided by caps $n^7\ o^7$, one on each side of the opening $q$, covering them back of their joints, and secured to the bed of the machine by tap-bolts, which also pass on the side of the recess nearest to the front of the machine, through the guides $l^{10}\ l^{11}$, and secure these guides to the upper surface of the caps $n^7\ o^7$. The two arms of the wire cross each other directly behind the rear projection, $k^3$, on the face of the former, and between the inner end of the upright standard $u^4$, which supports the head of the mandrel, and the depression $k^{17}$ at the left-hand side of the slot $k^{16}$ in the back of the former. The first two lateral plungers, $n\ o$, commence to move forward just before the front plunger, $h$, completes its forward motion, and make the inward bends, $w^7\ w^8$, in the respective arms of the wire, completing the loop $w^6$, and partially forming the middle outward bends, $w^9\ w^{10}$, in the arms, and they remain in contact with the arms, and preserve the form in which they have bent them, while the other lateral plungers and the vertical and back plungers are acting on the wire, and they commence to move backward just before the forward motion of the back plunger, $v$, is completed. The form in which the arms of the wire is bent by these lateral plungers is shown in Fig. 5 of the drawings. The second lateral plungers, $p\ r$, commence to move forward just before the forward motion of the other lateral plungers is finished, and they meet the wire just after the inward bends are made in the arms of the wire, and complete the outward bends, $w^9\ w^{10}$, in the arms of the wire and carry the arms across each other, the elevated or right-hand arm above and across the depressed or left-hand arm, and the lower arm below and across the upper, and bend the arms against their respective abutments, first causing the ends of the wire to move into the opening $q^1$ in the bed $a$, and against the back $r^{12}$ of the inclined plane $r^{11}$, and the under surface of the cap $v^{10}$ of the rear plunger at the left-hand side, $p^{11}$, of the slot $v^{12}$ in the cap; and as the forward motion of these lateral plungers continues, the arms of the wire are moved across each other, and diagonally against the end $u^6$ of the standard $u^4$, which supports the head of the mandrel, and the left-hand side, $k^{17}$, of the depression in the face of the former and angular bends are made in the arms near the point where they have crossed each other, so that the arms lie straight, $w^{13}\ w^{14}$, with their planes nearly parallel to each other, and extend into the square opening $q^1$ in the bed $a$. These lateral plungers remain in contact with the wire while the vertical and back plungers are acting, and commence to move backward at the same time with the back plunger. The form in which the wire is left by the action of these lateral plungers upon it is shown in Fig. 5. There are two vertical plungers or bending-dies, $s\ t$, which move simultaneously and at the same rate of motion, and one of which, $s$, moves downward in the square opening $q^1$ in the bed, and the slot $k^{16}$ in the back of the former, and the slot $v^{12}$ in the cap of the rear plunger, and the other, $t$, upward in the square opening $q^1$, and in the slot $v^{12}$ in the cap, to make their bends in the respective arms of the wire, and they partially form the hooks and bend the straight remaining portions, $w^{17}$ $w^{18}$, of the arms nearly at right angles with the bed of the machine. These vertical plungers form a semicircular bend, $w^{15}$ $w^{16}$, in each of the arms of the wire, so that the two bends, if in the same plane, would make a nearly true circle. Both of these plungers are exactly alike at their inner ends, where they hold and bend the wire, so that when their ends are brought together, as in the machine, where one ascends and the other descends at the same time and in such direction that their ends meet exactly, they fit into each other. Each of these plungers is recessed on both sides at its inner end, so as to form two dies, $s^1$ $s^2$ $s^3$ $s^4$ $t^1$ $t^2$ $t^3$ $t^4$, on each side, one of which is a male die, $s^1$ $s^3$ $t^1$ $t^3$, and the other a female die, $s^2$ $s^4$ $t^2$ $t^4$, and the plungers are so adjusted in the machine that upon their ends coming together each male die of one of the plungers is in the female die, which is on the reverse side of the same male die of the other plunger. One of the male dies, $s^1$ $t^1$, of each of these plungers bends an arm of the wire against its female die, $t^4$ $s^4$, in the other plunger, and forms the semicircular bend, $w^{15}$ $w^{16}$, in it, and at the same time the other male die, $s^3$ $t^3$, of the latter plunger bends the same arm against its female die, $t^2$ $s^2$, in the former plunger, and causes the arms $w^{17}$ $w^{18}$ to stand nearly at right angles to the plane of the loop $w^5$ of the snap-hook. The male die $s^3$ $t^3$, which forms this nearly perpendicular bend in the straight arm, is longer than the male die $s^1$ $t^1$, which forms the semicircular bend sufficiently to meet the end of the wire $w^{13}$ $w^{14}$ before the shorter male die $t^1$ $s^1$ of the other plunger meets it, and commences to make its semicircular bend in it, so that the respective arms of the wire are supported while the semicircular bends are made in them by the lateral plungers near the crossing of the arms, and by these longer male dies, $s^3$ $t^3$, near the ends of the arms, and are prevented from being sprung down or up and sidewise in the opening $q^1$ in the bed by the male dies $s^1$ $t^1$ of the descending or ascending plungers, which form the semicircular bends in the arms. The male die $s^1$ $t^1$ of each of these plungers, which forms the semicircular bend in the wire, is of a round form, and the other male die, $s^3$ $t^3$, is of an elliptical form, and the female dies $s^4$ $s^2$ $t^4$ $t^2$ are concave, and made to conform respectively to their male dies. Both the concave and convex ends or bending-surfaces of the dies are grooved with round grooves to fit the wire, and afford a seat for it in making their respective bends in the wire. Each of these vertical plungers $s$ $t$ is of a thickness a little more than the two diameters of the arms of the wire which are bent in them. These vertical plungers commence to move the ascending plunger $t$ upward, and the descending plunger $s$ downward, as soon as the two lateral plungers, $p$ $r$, which cross the arms of the wire, have ceased to move forward, and the ascending plunger $t$ bends the lower arm, $w^{14}$, of the wire upward against the descending plunger $s$, and the under surface of the projecting part $r^7$ of the lateral plunger $r$, which moves the upper arm of the wire and forms the semicircular bend $w^{16}$ in the lower arm, and at the same time the remaining straight portion $w^{18}$ of the lower arm is bent downward and nearly at right angles to the plane of the bed of the machine, and the descending plunger $s$ bends the upper arm, $w^{13}$, of the wire downward against the ascending plunger $t$, and the upper surface of the projecting part $p^7$ of the lateral plunger $p$, which moves the lower arm of the wire and forms the semicircular bend $w^{15}$ in the upper arm, and at the same time the remaining straight portion $w^{17}$ of the upper arm is bent upward and nearly at right angles to the bed of the machine; and these plungers move back again the ascending plunger $t$ downward, and the descending plunger $s$ upward, immediately after making their respective bends in each arm of the wire. The form in which the wire is left after these vertical plungers have made their bends in it is shown in Fig. 6. The descending plunger $s$ is secured to its lever $s^5$ by tap-bolts $s^6$; but the ascending plunger $t$ extends below its connection $t^6$ $t^7$ with its lever $t^5$, and is pivoted to its lever, and this lower part has a stud, $t^9$, in its side near its end, which engages in an angular slot in a bar, $t^{10}$, secured to the frame $a$ of the machine, and by this means the grooved end of the ascending plunger $t$, after it has moved downward and out of the opening $q^1$ in the bed of the machine, is further moved toward the rear of the machine by the movement of the stud $t^9$ toward the front of the machine in the slot, so as to be out of the way of the finished snap-hook when it drops from the machine. This slot in the bar is straight for a portion of its length, in which the stud $t^9$ of the lower part of the plunger moves downward in the downward motion of the plunger, and the direction of the remainder of the slot is toward the front of the machine, and the stud $t^9$ moves in this latter portion of the slot during the remainder of the downward motion of the lever of the ascending plunger, and swings the grooved end of the plunger toward the back of the machine. The vertical plungers are slotted where they are secured to their levers, the upper plunger by tap-bolts $s^6$, and the lower by a pin, $t^6$, through slots in the lever and plunger, and they are thus rendered adjustable, and they are set in the machine in such position that both move in making the semicircular bends in the wire past the central line running through the center of the hooks of the finished snap-hook, and the point of crossing of the arms, and move to exactly the same distance beyond said central line, so that the two hooks of the finished snap-hook are exactly concentric with each other.

The mandrel $u$ fits in the recess $m^1$ in the bed, on the right-hand side of the opening $q^1$, between the upright standard $u^4$ in the plate $m^3$ set in the recess and the side $m^{14}$ of the recess, and it moves on the bed of the recess and the plate $m^3$ set in the bed, and its upper surface is flush with the bed, except at its inner end, and is guided by the side $m^{14}$ of the recess and the plunger $r$ next to it, and by the cap $o^7$, which covers it, as well as the plungers $o$ $r$ on the same side of the opening $q$. The inner end of the mandrel is raised and rounded sufficiently to fit the semicircular bends $w^{15}$ $w^{16}$ in the arms of the wire, and bring the center of the round end of the mandrel into said central line of the finished snap-hook, and its inner end is also tapered slightly, so as to pass readily into and through the semicircular bends in the arms of the wire. The under surface of the mandrel at its inner end is recessed, so as to allow the mandrel to pass over the plate set in the bed of the recess. The square head $u^1$, (see Fig. 1,) next to the round portion of the inner end of the mandrel, is supported by the upright standard $u^4$ in the plate $m^3$ set in the recess $m^1$, and the tapering end of the round mandrel $u$ fits into the cavity $m^9$, made in the upper surface of the steel piece $m^8$, set opposite to the mandrel in the recess $m$. The round mandrel $u$ and its square head $u^1$ are also supported by the lower edge of the back $k^7$ of the former, on the right-hand side of the slot $k^{16}$ in the former, and the mandrel is thus held firmly while the back plunger is completing the bending of the hooks round it. The mandrel is drawn back out of the way of the arms of the wire as they are swept over the bed of the machine in making the first bend in the wire, and commences to move forward while the vertical plungers $s$ $t$ are moving away from the wire, and passes through the semicircular bends $w^{15}$ $w^{16}$ after the vertical plungers have moved away from them, and remains within the semicircular bends until the back plunger, $v$, has bent the hooks round it, and commenced its backward motion, when the mandrel moves backward and leaves the finished snap-hook free to drop from the machine.

The rear plunger is made in two parts, $v$ $v^1$, united by countersunk screws, so that the forward part, $v$, may be readily removed and another substituted for it of the same or different size. The inner end, $v^2$, of the forward part is forked, so as to leave a vertical circular opening for forming the hooks around the mandrel. Each side, $v^3$ $v^4$, Fig. 14, of the vertical opening is composed of two dies—one longer than the other—the lower left-hand and the upper right-hand dies $v^5$ $v^7$ being longer than the upper left-hand and the lower right-hand dies $v^6$ $v^8$. The two sides $v^3$ $v^4$ of the opening are exactly alike, but in reverse positions to each other. The shorter dies $v^6$ $v^8$ in each side of the opening bend the straight portions $w^{17}$ $w^{18}$ of the arms of the wire round the mandrel, and complete the hooks. The longer dies $v^5$ $v^7$ in each side of the opening meet the semicircular bends $w^{15}$ $w^{16}$, formed by the vertical plungers, before the shorter dies meet the straight portions of the arms, and support the semicircular bends, while the straight portions of the same arm are bent round the mandrel, and thus prevent the semicircular portions from being bent up or down, and out of the circular form, while the straight portions of the arms are bent round to complete the hooks. The rear part, $v^1$, of the back plunger is square, and the fore part of it is also square for a short distance from the connection between the two; but the remaining portion $v^2$ to the inner end of the plunger is flattened, so as to bring the flat portion in a vertical position in the machine. The width of this flat portion is a little more than the diameter of the hooks in the finished snap-hook, and its thickness is a little more than two diameters of the wire, and the dies in each side of the opening are made with continuous grooves in them, fitting the wires so that they partly encircle the two hooks in completing the bending of the hooks. The back plunger is fitted in two right-angled grooves, $v^9$ $v^{11}$—one, $v^9$, made in the bed of the machine, and the other, $v^{11}$, in the cap which covers the back plunger—which serve as guides and supports for the plunger in its forward and backward motion, and the plunger is set cornerwise in these grooves, and its vertical end moves in the square opening formed in the bed of the machine and in the cap of the back plunger. The back plunger, $v$, commences to move forward as soon as the forward motion of the mandrel $u$ is ended, and the longer end $v^7$ of the upper part of the opening meets the semicircular bend $w^{16}$ in the lower arm of the wire, and supports it while the shorter end $v^8$ of the lower part of the opening on the same side of the vertical portion $v^2$ of the back plunger is bending the straight portion $w^{18}$ of the same arm round the mandrel $u$ to complete the hook in it; and the longer end $v^5$ of the lower part of the opening meets the semicircular bend $w^{15}$ in the upper arm of the wire, and supports it while the shorter end $v^6$ of the upper part of the opening on the same side of the vertical portion $v^2$ of the back plunger is bending the straight portion $w^{17}$ of the upper arm round the mandrel, and completes the hook in the upper arm; and the back plunger commences to move backward as soon as the two hooks are finished and slightly in advance of the backward motion of the mandrel $u$. The finished snap-hook, (shown in Figs. 15 and 16,) after the back plunger has formed the hooks in it, is forced off of the former by the pusher, and falls through the opening $q$ $q^1$ in the bed of the machine into a receptacle set under the machine. The pusher commences to move downward immediately after the rear plunger $v$ commences its backward motion, and the upward motion of the pusher $f$ commences as soon as the front plunger, $h$, commences to move forward, and is finished and the head of the pusher withdrawn into its recess in the face of the former and above the surface of the face of the former before the plunger $h$ commences to bend the wire against the former. The head of the pusher disengages the finished snap-hook from the former, and insures its dropping from the machine by its own weight. The grooves in the ends of the plungers, which fit, conduct, and support the wire, also enable the plungers to make their respective bends in the wire without marring it.

There are ten separate cams upon the lower shaft, $y$, each of which is grooved, either upon its side or periphery, with square grooves to accommodate the pins or studs of the levers and their rollers, and one of them is grooved upon both sides, thus forming a double cam. The cams are secured to the shaft $y$ by set-screws, and a small space is left between the cams, so that their position upon the shaft may be varied according to the difference in the articles to be formed on the machine. Each of the pins of the levers stands tangential to the shaft $y$, upon which the cams are placed, and the end of each of the pins is of smaller diameter than the rest of the pin, and forms the axis of the loose roller, which is rotated on it by the friction of the sides of the groove in the cam, and the shoulder formed in the pin by the axis of the roller prevents the roller from slipping up out of the groove. The double cam $y^5$ is the middle one of the nine placed between the bearings of the shaft, and the left-hand portion of this cam, which is of larger periphery than the right-hand part, has the groove in its left-hand side, and actuates the bent lever $h^{23}$ of the front plunger, $h$, which has its fulcrum $h^{24}$ in the bracket $h^{28}$ secured to the under side of the bed, and is connected with its plunger by two links and the bar $h^{27}$, which moves in a groove in the under side of the bed, and is bolted to the plunger $h$ $h^1$ between its two guides. The right-hand side of the double cam has the groove upon its side, and actuates the crank-lever $v^{13}$ of the rear plunger, which has its fulcrum $v^{14}$ in the other bracket, $v^{15}$, secured to the under side of the bed, and is connected with its plunger by the link $v^{16}$, which is jointed to the rear end of the plunger. Next to the double cam are placed the cams $y^4$ $y^6$, one on each side of it, which actuate the levers of the vertical plungers $s$ $t$. The pin and roller of the lever $s^5$ of the upper or descending plunger engage in the groove of the right-hand side of the cam $y^6$, which is placed on the left of the middle cam, and has its fulcrum $s^9$ in the upright lug $s^{10}$, formed in the plate which covers the cap of the rear plunger, and the pin and roller of the lever $t^5$ of the lower or ascending plunger passing under the bed engage in the groove in the left-hand side of the cam $y^4$, which is placed on the right of the middle cam, and has its fulcrum in the bracket $v^{15}$.

Next in position are placed, on each side of the middle cam, the cams $y^3$ $y^7$, having the grooves upon their periphery, in which engage the pins and rollers of the levers $n^{10}$ $o^{10}$ $p^{13}$ $r^{14}$ of the four lateral plungers. The levers $p^{13}$ $r^{14}$ of the second lateral plungers, $p$ $r$, which carry the arms of the wire across each other, are bent, and their pins are placed behind and near the pins of the levers $n^{10}$ $o^{10}$ of the first lateral plungers, $n$ $o$. The ends of the two pins are less than an inch apart, and the front pins are connected with the respective levers $n^{10}$ $o^{10}$ of the first lateral plungers, and the back pins with the levers $p^{13}$ $r^{14}$ of the second lateral plungers. All of these levers $n^{10}$ $o^{10}$ $p^{13}$ $r^{14}$ pass under the bed, and are pivoted on bolts, which afford the fulcrums $n^{11}$ $o^{11}$ $p^{14}$ $r^{15}$ of the levers, and pass through the plungers and the bed, and the levers are connected with their respective plungers by links pivoted to the levers, and connected with the respective plungers by stems formed on the under side of the respective plungers, and passing through the respective links, and moving in slots formed respectively in the recesses $m$ $m^1$ in the bed, beneath the respective plungers. These links are shown by dotted lines in Fig. 1. The cam $y^2$, which actuates the lever $u^{10}$ of the mandrel $u$, is placed on the right of the middle cam, and next to the cam $y^3$, which actuates the levers $o^{10} r^{14}$ of the two lateral plungers $o$ $r$ on the right-hand side of the former, and has the groove upon its periphery. The lever $u^{10}$ of the mandrel is above the bed, and pivoted at its fulcrum $u^{11}$ by a bolt to a bracket, $u^{12}$, extending from and secured to the rear right-hand corner of the bed, and is pivoted also at its end to the link $u^{13}$, which connects it with the mandrel, and is pivoted to the upper surface of the mandrel near its outer end. The cam $y^8$, which actuates the lever $d^2$ of the moving shear $d^1$, is placed to the left of the middle cam, and next to the cam $y^7$, which actuates the levers $n^{10} p^{13}$ of the two lateral plungers $n$ $p$ on the left-hand side of the former, and has the groove in its right-hand side. This lever $d^2$ passes under the bed, and is bent at right angles at its fulcrum $d^6$, where it is pivoted to the lower part of the head $c^6$ of the slide-bar. The two remaining cams $y^1$ $y^9$, placed within and next to the bearings of the shaft, have the grooves in their periphery, in which engage the pins and rollers of the respective levers $i^{17}$ $j^{17}$, which actuate the milling-spindles $i^2$ $j^2$. The right-hand lever, $j^{17}$, passes under the bracket $u^{12}$, and is pivoted to it at its fulcrum $j^{23}$, in the front end of the bracket, opposite to the fulcrum of the lever of the mandrel, and also passes under the outer end of the mandrel. The left-hand lever, $i^{17}$, is pivoted, at its fulcrum $i^{23}$, to the upper surface of the arm $c^{11}$, which is secured to the left-hand side of the bed, and affords the fulcrum of the lever of the carrier. The respective studs of the levers $i^{17}$ $j^{17}$ of the milling-spindles are secured to the upper surfaces and near the outer ends of the levers, and fit in the rollers in the under part of the grooves in the respective collars $i^{13} j^{13}$. The cam $y^{10}$, which actuates the lever of the carrier, is placed on the left-hand end of the shaft y, outside of the wheel $x^2$, and has the groove in its periphery.

The direction of the respective grooves in the cams is such as to actuate the respective levers at the proper time to give the respective movements to the plungers, shear, carrier, and milling-spindles.

The coil of wire, of suitable size and quality, is placed upon a reel, in a convenient position to be fed into the machine; but before the wire enters the channel of the carrier it is gently uncoiled by leading it between the adjustable rollers $c^{14}$, which restores it to about the same state as in the course of its manufacture after it was drawn and before it was coiled, without straightening it or impairing its elasticity. The carrier $c^2$ commences to move forward at the same time with the front plunger, $h$, and finishes its forward motion by the time when the vertical plungers $s\ t$ make their return movement, and the backward motion of the carrier commences as soon as the shears $d\ d^1$ have cut the wire, and while it is moving backward the hooks of the snap-hook are finished, and the complete snap-hook is knocked off of the machine. During the forward motion of the carrier the roulettes are at rest, and the most advanced piece of wire is moved out of the notches of the roulettes and formed into a snap-hook, except the completion of the hooks by the back plunger and the mandrel. Accordingly, there are four pieces of wire in the machine at the same time, except when the finished hook is knocked off, one of which is just cut, the next in advance is idle in the notches of the roulettes, the third piece is having its ends milled, and the fourth is receiving the bends which form it into a snap-hook; and while the front plunger is moving forward one piece of wire is in advance of it, and passing up to the former and around it, and the two next behind it are in the notches of the roulettes, and the carrier is feeding the fourth piece through the notches of the roulettes.

The machine is automatic in its entire operation, and all of its motions are positive.

After the machine is in full operation, at each revolution of the shaft $y$, upon which the cams are placed, a complete snap-hook is delivered from the machine.

The operation of the machine may be as rapid as required, and it will make twenty-four snap-hooks a minute, although it is run at a low rate of speed.

What I claim as my invention, and desire to secure by Letters Patent, is—

1. The improved machine herein described, for making snap-hooks, consisting of the mechanism for feeding, cutting, and milling the ends of the piece of wire or other suitable material, and bending and forming the same into a snap-hook, substantially as described.

2. The combination of the former $k$, front plunger, $h$, lateral plungers $n\ o\ p\ r$, vertical plungers $s\ t$, rear plunger, $v$, and abutments $k^{17}\ p^{11}\ u^6\ r^{12}$, arranged and operating substantially as described.

3. The combination of the former $k$, the front plunger, $h$, the lateral plungers $n\ o$, and the lateral plungers $p\ r$, arranged and operating to make the loop and the inward and outward bends successively in the arms of a piece of wire or other suitable material, substantially as described.

4. The lateral plungers $p\ r$, constructed with the projecting ends $p^7\ r^7$, combined with their respective abutments $k^{17}\ p^{11}\ u^6\ r^{12}$ and former $k$, and operated to cross the respective arms of the snap-hook, substantially as described.

5. The lateral plungers $p\ r$, the vertical movable dies $s\ t$, the rear plunger, $v$, and the mandrel $u$, combined and operated to form the hooks of the snap-hook, substantially as described.

6. The combination of the lateral plungers $p\ r$ and the vertical movable dies or plungers $s\ t$, and former $k$, arranged and operated to make the partially-formed hooks $w^{15}\ w^{16}$ in the two arms of a piece of wire or other suitable material, substantially as described.

7. The combination of the movable dies $s\ t$, the plunger $v$, and the mandrel $u$, arranged and operating substantially as described.

8. The movable die or plunger $v$, constructed with two long dies, $v^5\ v^7$, and two short dies, $v^6\ v^8$, at its inner end, but in reverse positions on each side of the end of the plunger, in combination with the mandrel $u$, and operating to complete the bending and forming of the snap-hook, substantially as described.

9. The movable dies or plungers $s$ and $t$, combined together, and arranged so that their ends act upon each other, substantially as described.

10. The plunger $t$, bearing at its lower end the pin $t^9$, and connected to and operated by the lever $t^5$, as described, in combination with the slotted standard $t^{10}$, as and for the purpose specified.

11. The movable dies $n\ o\ p\ r$, constructed with loose joints, and moving in seats formed in the recesses in the bed, in combination with the plates having beveled edges, and set in the recesses, so as to allow the dies to rise and fall in the course of their forward and backward motions, substantially as and for the purpose described.

12. The movable die $h^1$, in combination with the roulettes $e\ e^1$ and griper $g$, operated by the movable die $h^1$, and arranged substantially as described.

13. The movable die $h^1$, roulettes $e\ e^1$, and the griper $g$, in combination with the milling mechanism, substantially as described.

14. The movable die or plunger $h\ h^1$, constructed in two parts, united by a loose joint, and having the forward part, $h$, depressed to the bed $a$ at its inner end, $h^4$, with the open recess between the bed and the forward part, $h$, in combination with the bed, upon which the plunger moves, and the notches $e^2$ of the roulettes, which hold the wire, so as to allow the wire to be advanced on the bed in the recess beneath the forward part, $h$, of the plunger, and to be further advanced on the bed toward the former $k$ by the depressed end of the plunger, which rides over the wire in its backward movement, substantially as described.

15. The movable die $h$ $h^1$, in combination with the stud of the standard $h^{15}$, secured to the said movable die, and the catch $e^{10}$ and pins $e^9$ of the roulette $e$, for rotating the roulettes $e$ $e^1$ at the same time with the return movement of the said movable die, substantially as and for the purpose described.

16. The combination of the pusher $f$, working through the former $k$, with the stud $h^{16}$, moving in a slot in the lever of the pusher, and secured to the movable die $h$ $h^1$, substantially as described.

JOHN T. FOSTER.

Witnesses:
E. F. HARTE,
H. W. YERINGTON.